United States Patent [19]
Skeels et al.

[11] Patent Number: 5,730,551
[45] Date of Patent: Mar. 24, 1998

[54] SUBSEA CONNECTOR SYSTEM AND METHOD FOR COUPLING SUBSEA CONDUITS

[75] Inventors: Harold Brian Skeels, Kingwood; Bill George Louis, Houston, both of Tex.

[73] Assignee: FMC Corporation, Chicago, Ill.

[21] Appl. No.: 557,643

[22] Filed: Nov. 14, 1995

[51] Int. Cl.$^6$ .................................................. F16L 1/04
[52] U.S. Cl. ..................... 405/170; 166/343; 166/347; 405/169
[58] Field of Search .................................. 405/169, 170, 405/171; 166/338, 339, 341, 343, 347

[56] References Cited

U.S. PATENT DOCUMENTS

| | | | |
|---|---|---|---|
| 3,298,092 | 1/1967 | Dozier et al. | 405/169 X |
| 3,434,296 | 3/1969 | Otteman et al. | 405/169 X |
| 3,592,014 | 7/1971 | Brown | 405/169 |
| 3,846,992 | 11/1974 | Liautaud | 405/169 |
| 4,086,778 | 5/1978 | Latham et al. | 166/343 X |
| 4,133,182 | 1/1979 | Chateau | 405/169 |
| 4,459,065 | 7/1984 | Morton | 166/343 X |
| 4,616,706 | 10/1986 | Huffaker et al. | 166/347 X |
| 4,784,523 | 11/1988 | Louis et al. | 405/169 |

FOREIGN PATENT DOCUMENTS

| | | | |
|---|---|---|---|
| 0296137A1 | 12/1988 | European Pat. Off. | F16L 1/04 |
| 2300339 | 11/1996 | United Kingdom | E21B 43/013 |

*Primary Examiner*—Dennis L. Taylor
*Attorney, Agent, or Firm*—Henry C. Query, Jr.

[57] ABSTRACT

A subsea connector system and method utilizing a skid (18) on the sea floor (F) four coupling a subsea conduit (16) carried by the skid (18) to a subsea conduit (12) on a relatively fixed subsea structure (10). A lift line device or structure (24) has an upper lift line (36) connected by a spreader bar (40) to a pair of lower guide lines (38) which are directed from a vertical position to a generally horizontal relation by J-tubes (30). The ends of the guide lines (38) have anchor members (42) thereon which are anchored to guides (46) on the subsea facility (10). Upon raising of the upper lift line (36), the skid (18) moves in a combined pulling and lifting motion to engage a side (52) of the subsea facility (10) for being guided into a docked position with aligned guides (46) on the subsea facility (10). In this position, an ROV (26) secures the skid (18) into a releasably locked position by insertion of retainer pins (not shown) into aligned openings (35, 51) of the skid (18) and subsea facility (10). Then, coupling (20) on the end of flowline conduit (16) is coupled onto aligned conduit (12) on the subsea facility (10). A preferred embodiment is shown in FIGS. 8–11 for connecting horizontal conduits (12A, 16A). Another embodiment is shown in FIGS. 12–16 for connecting vertical conduits (16B, 17B) on skid (18B) and wellhead structure (14B).

20 Claims, 13 Drawing Sheets

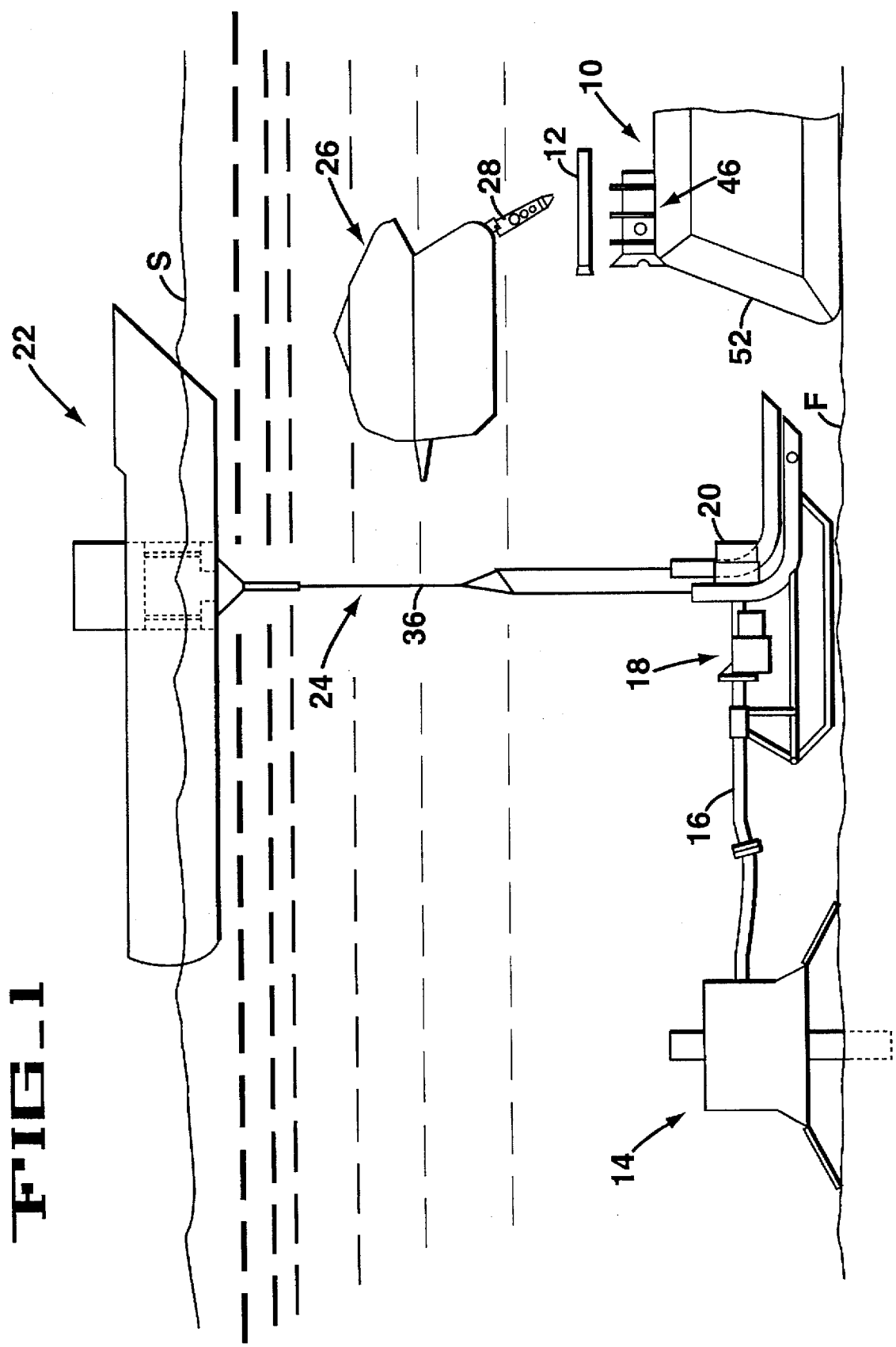

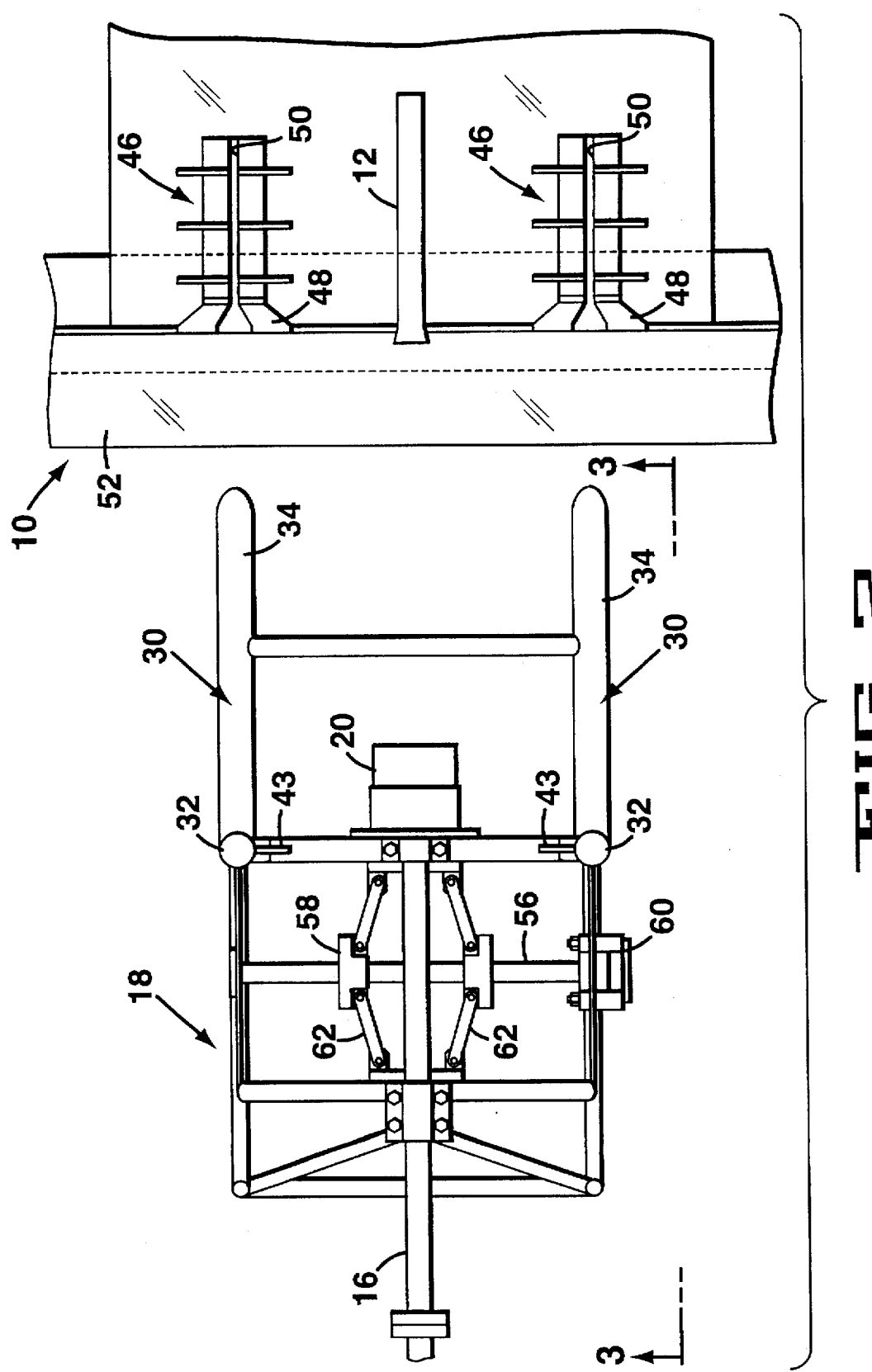
FIG_2

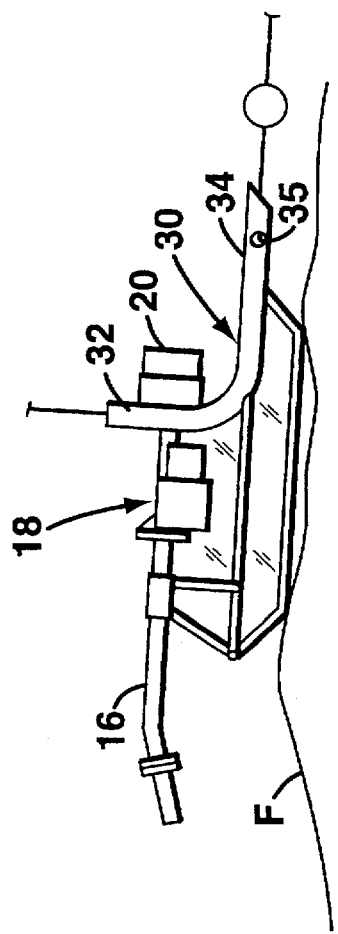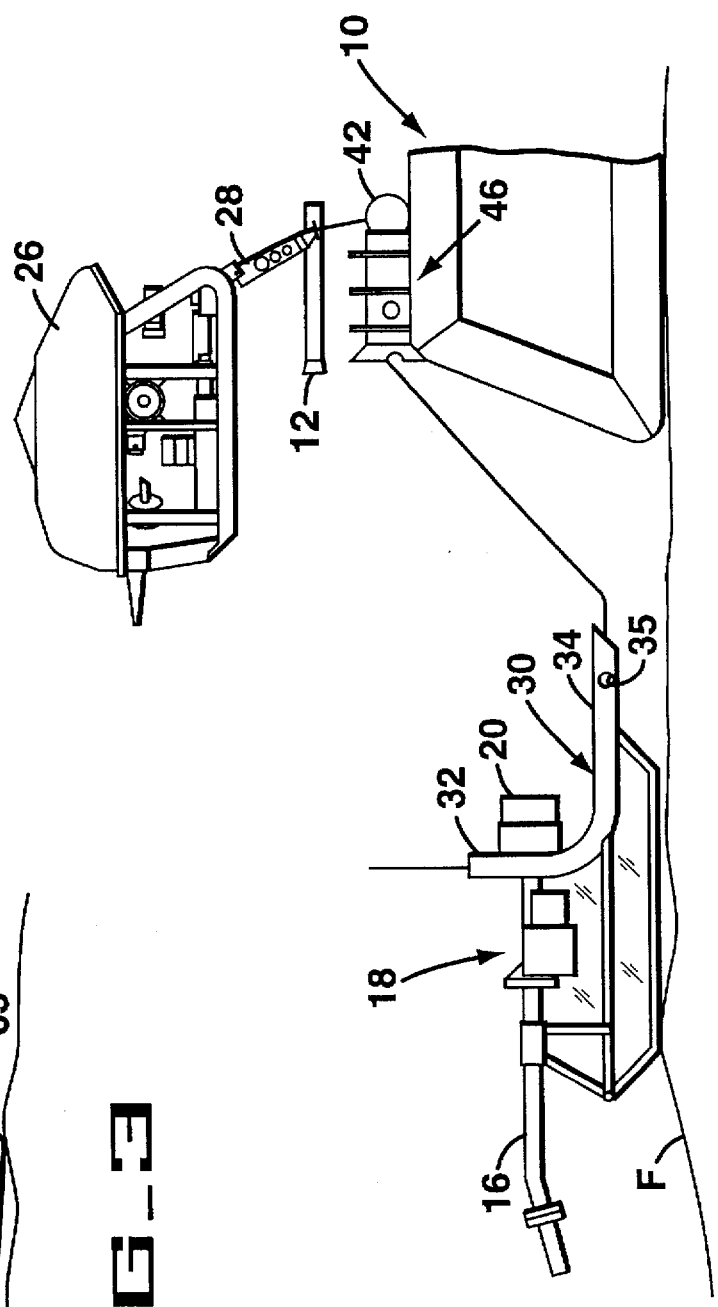

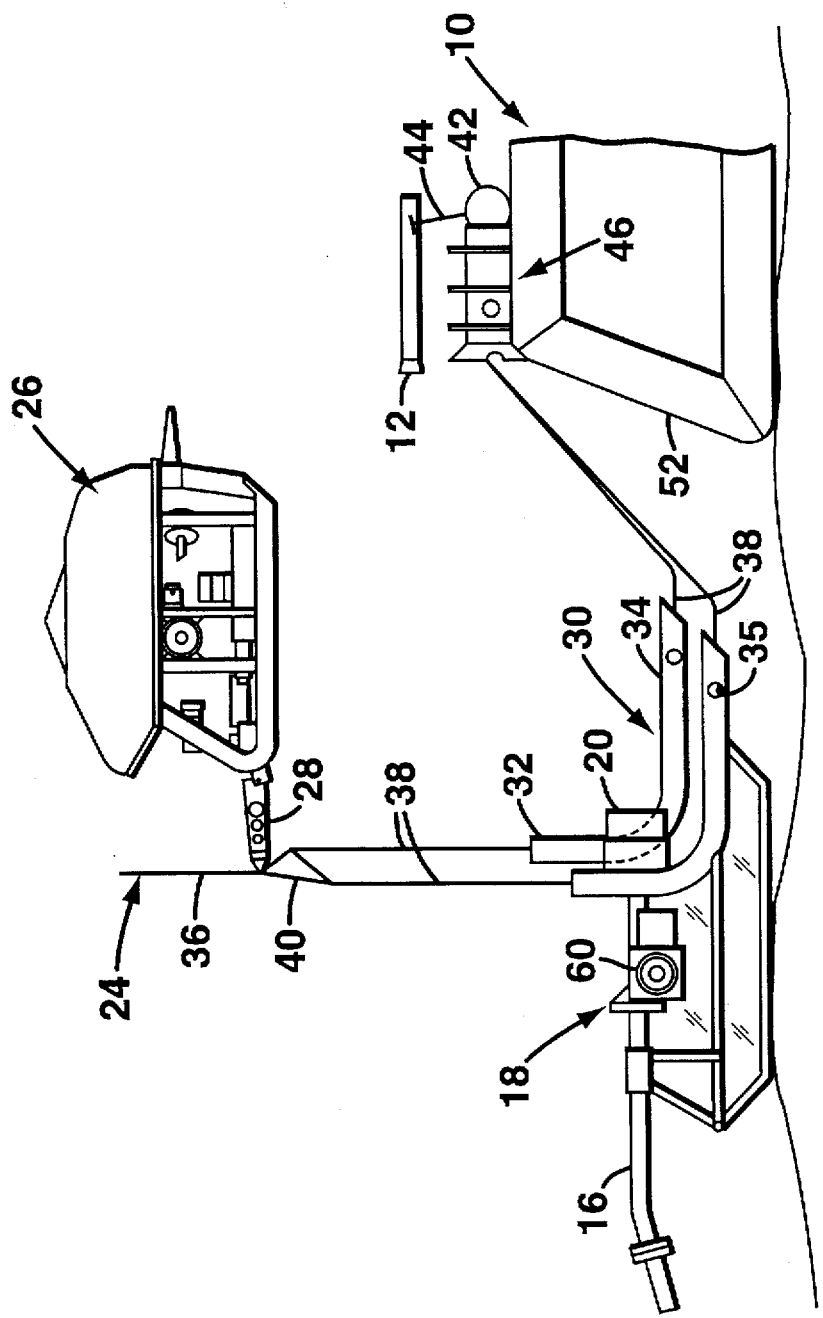
FIG_5

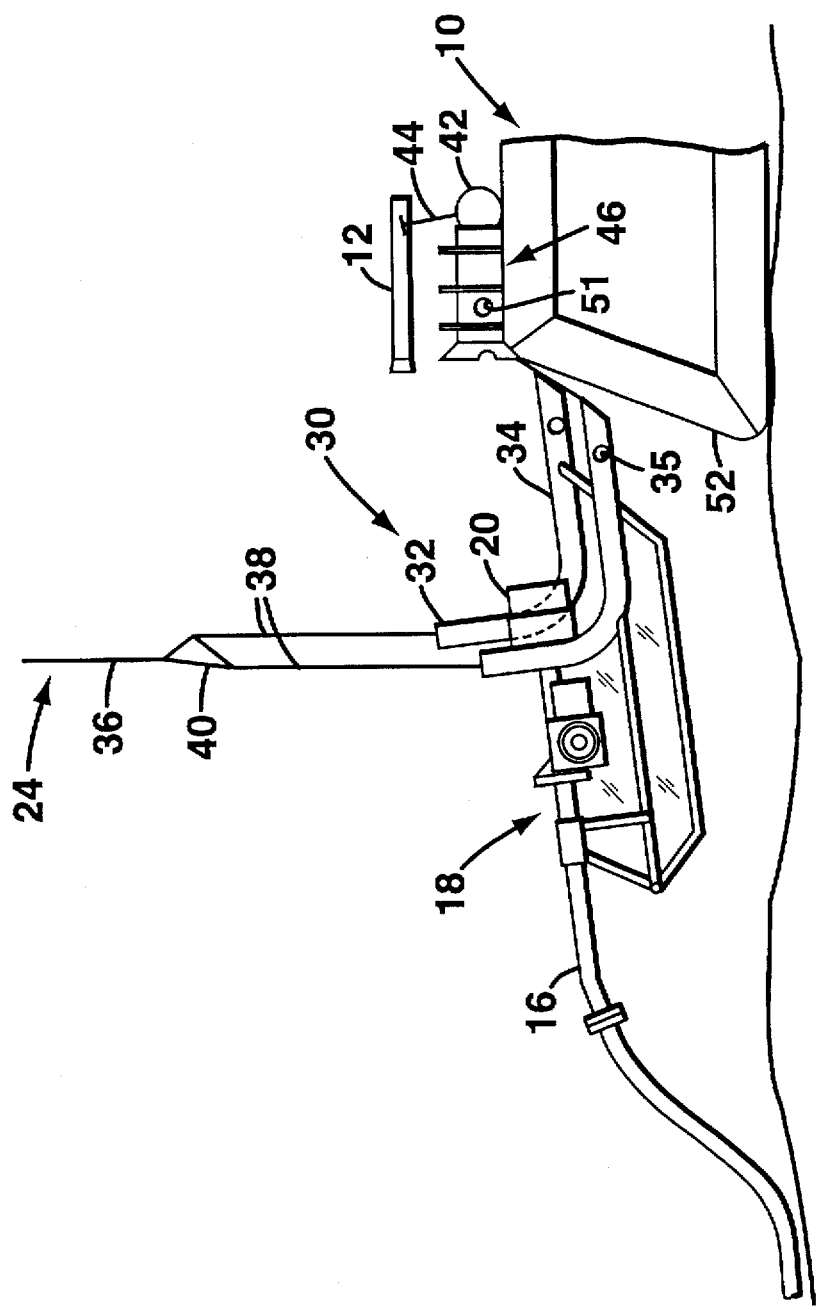

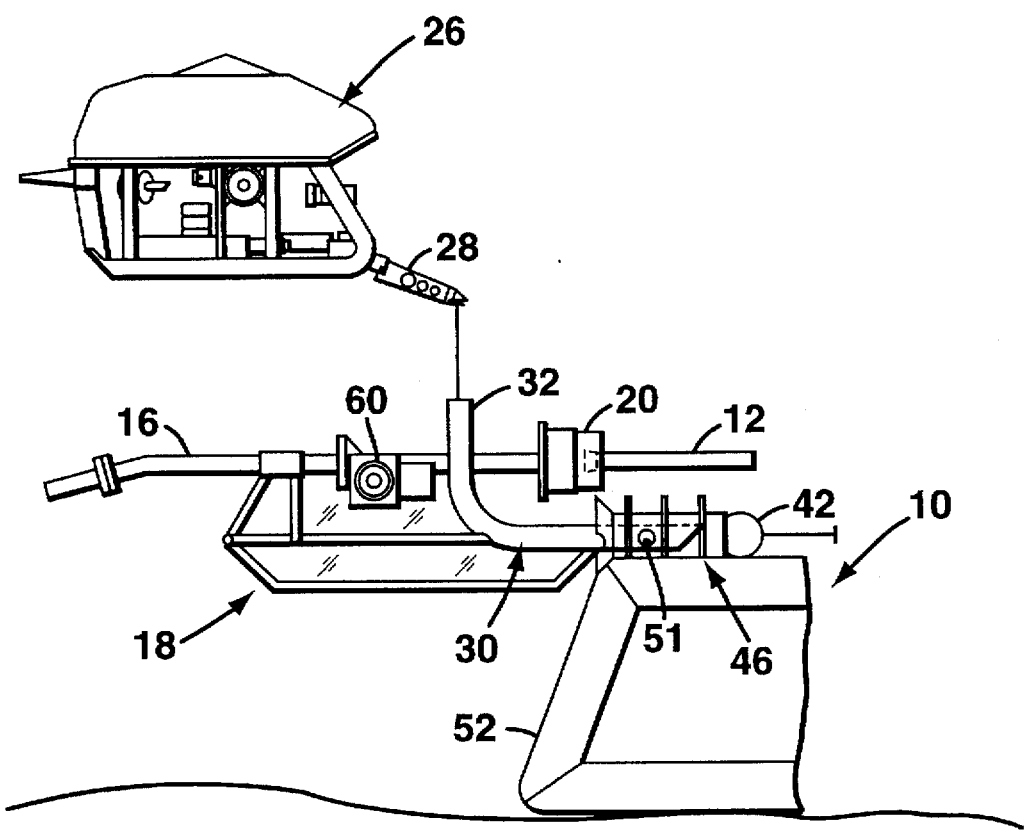
FIG_7

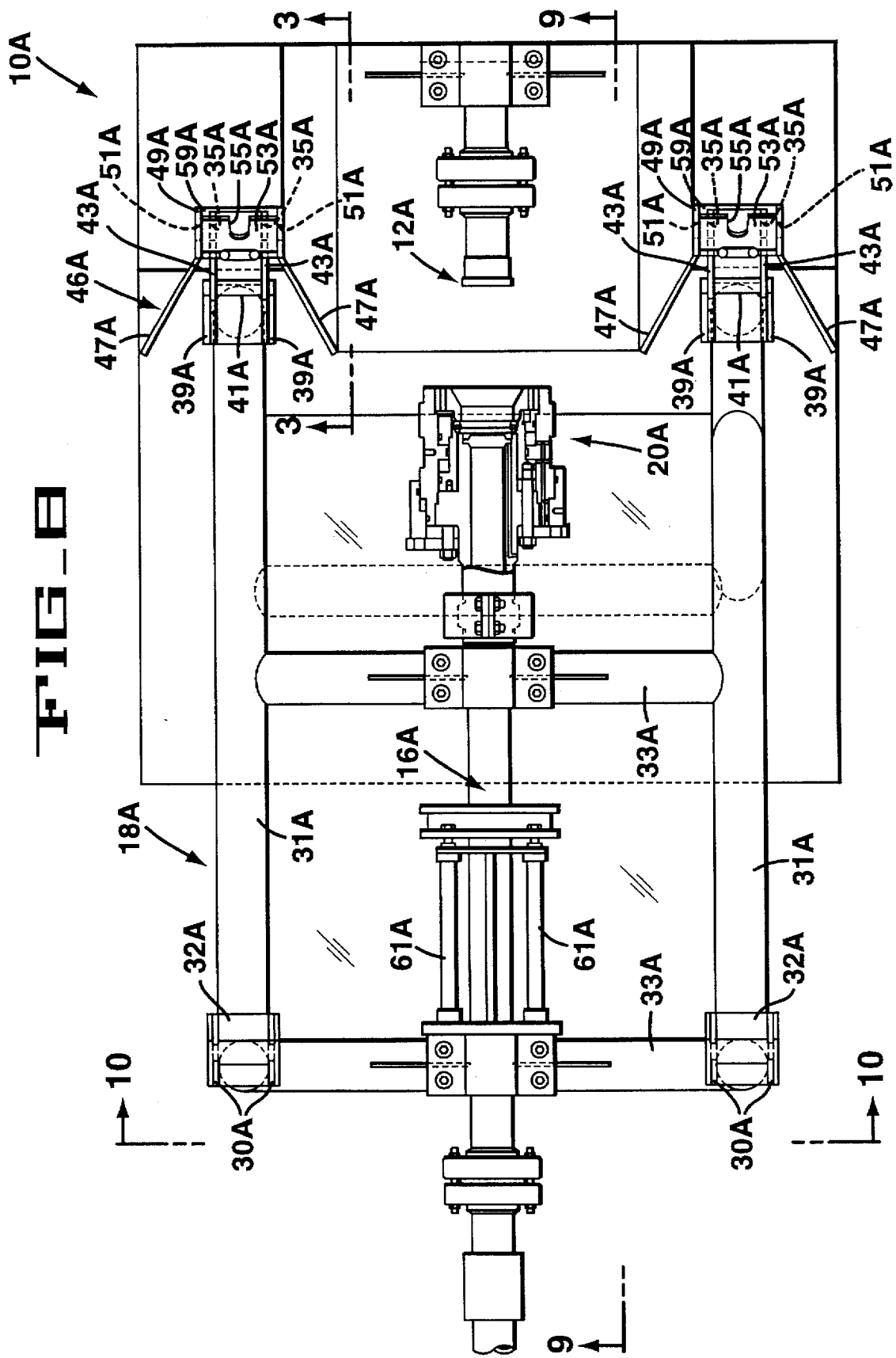
FIG_8

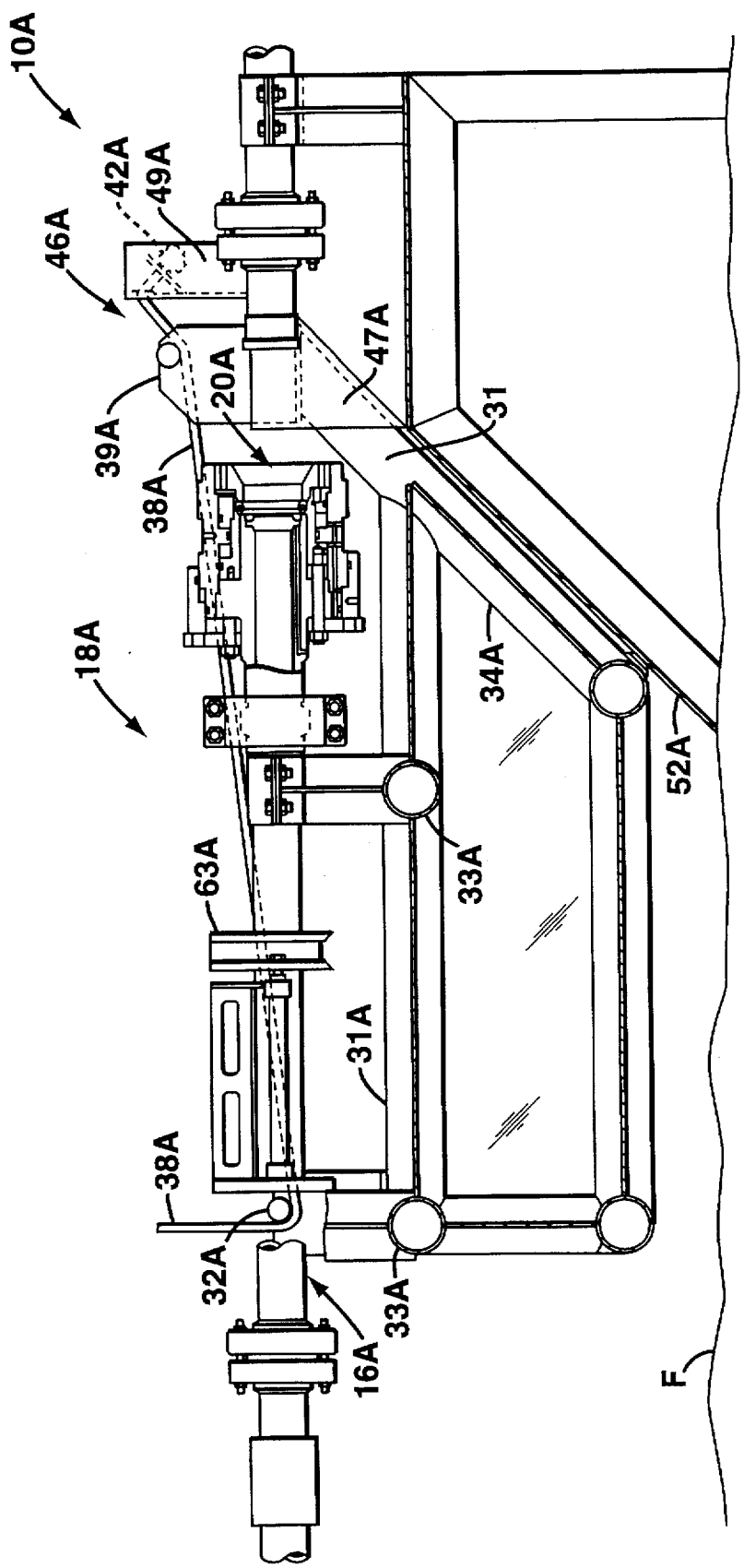

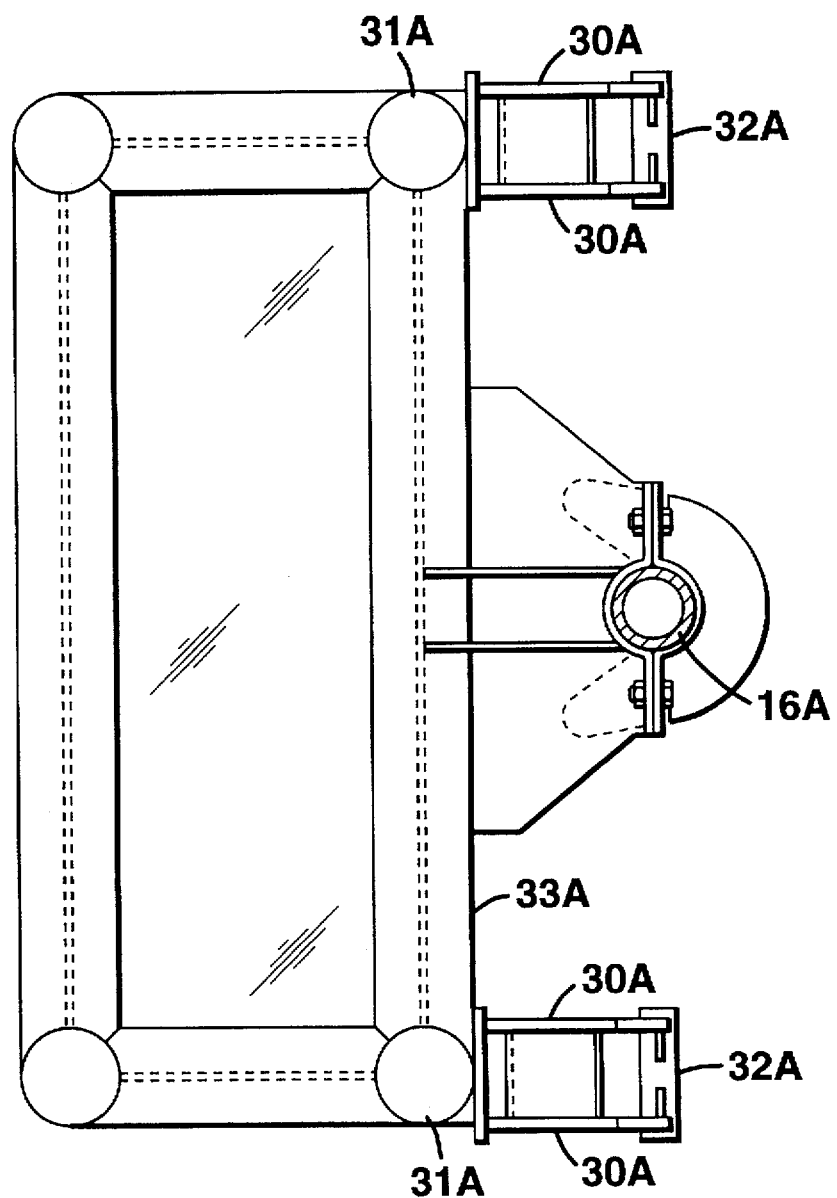
FIG_10

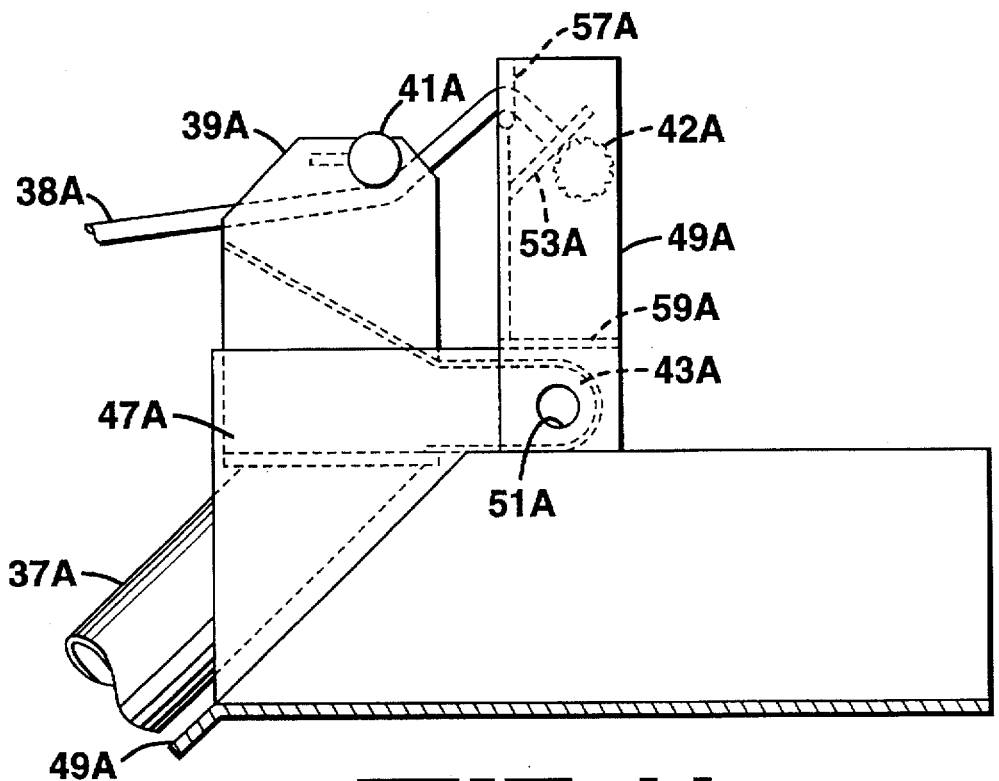
FIG_11
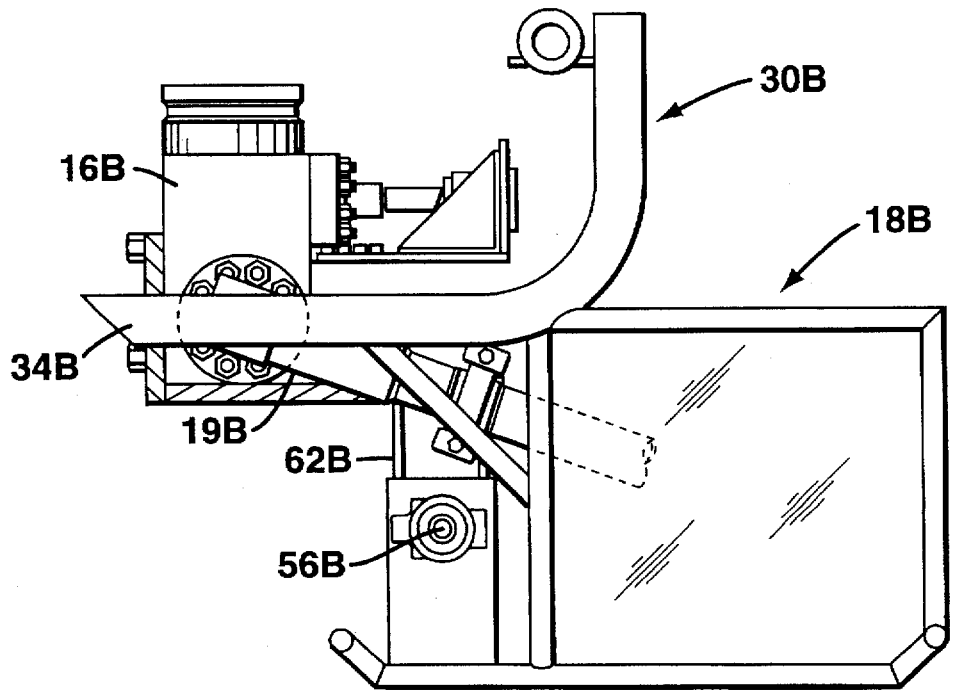
FIG_12

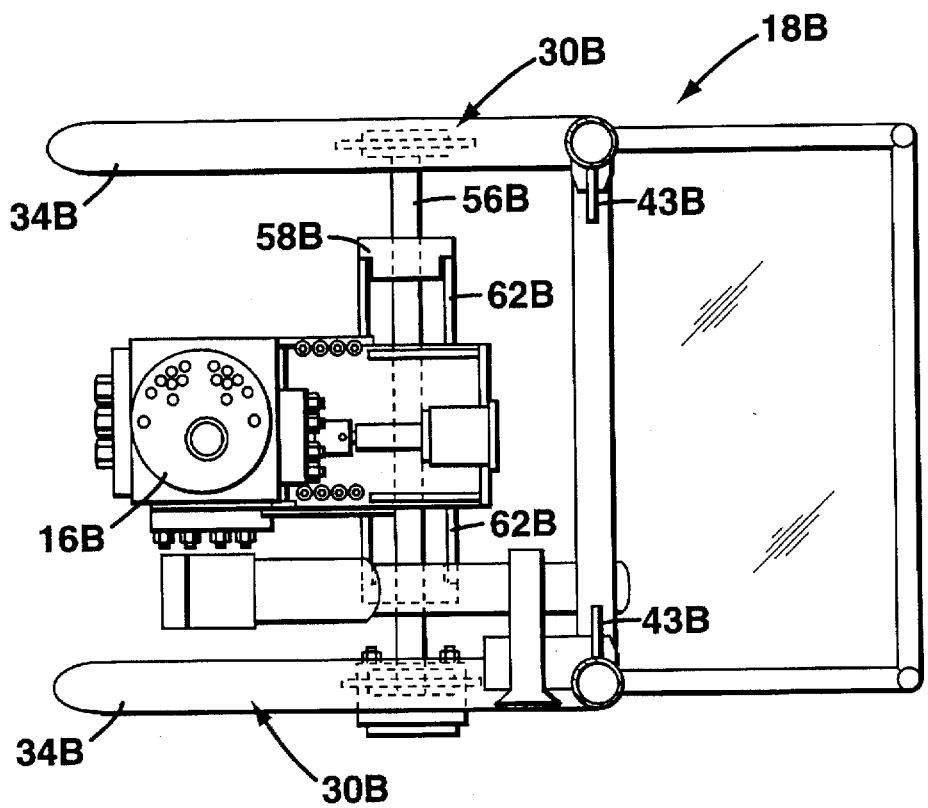
FIG_13
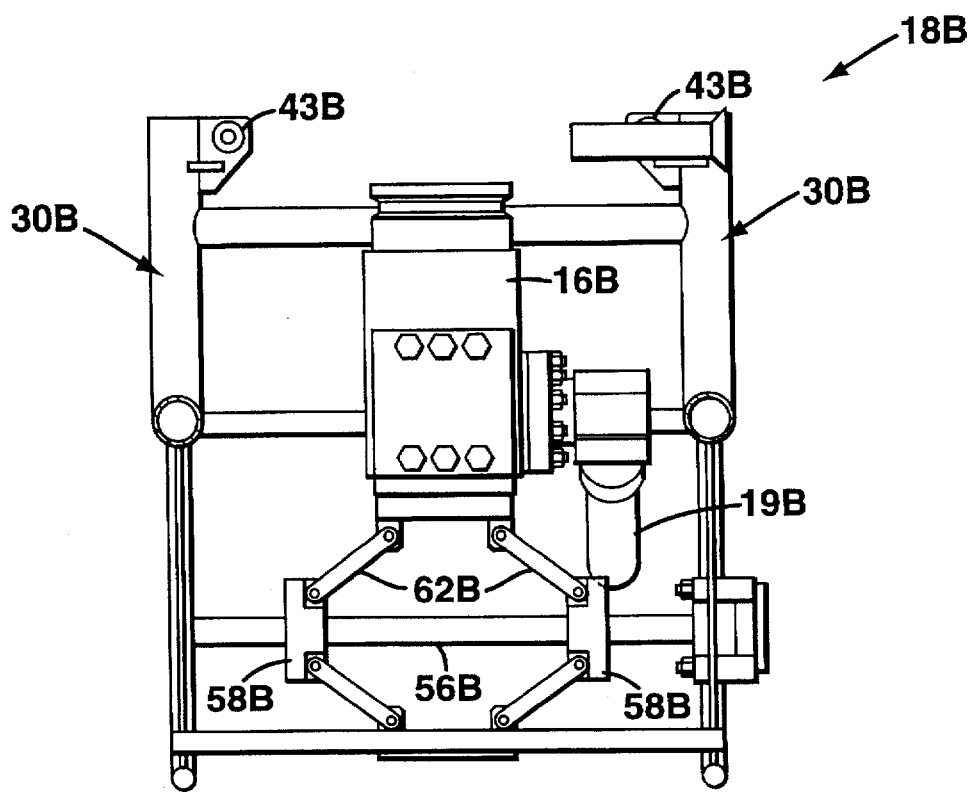
FIG_14

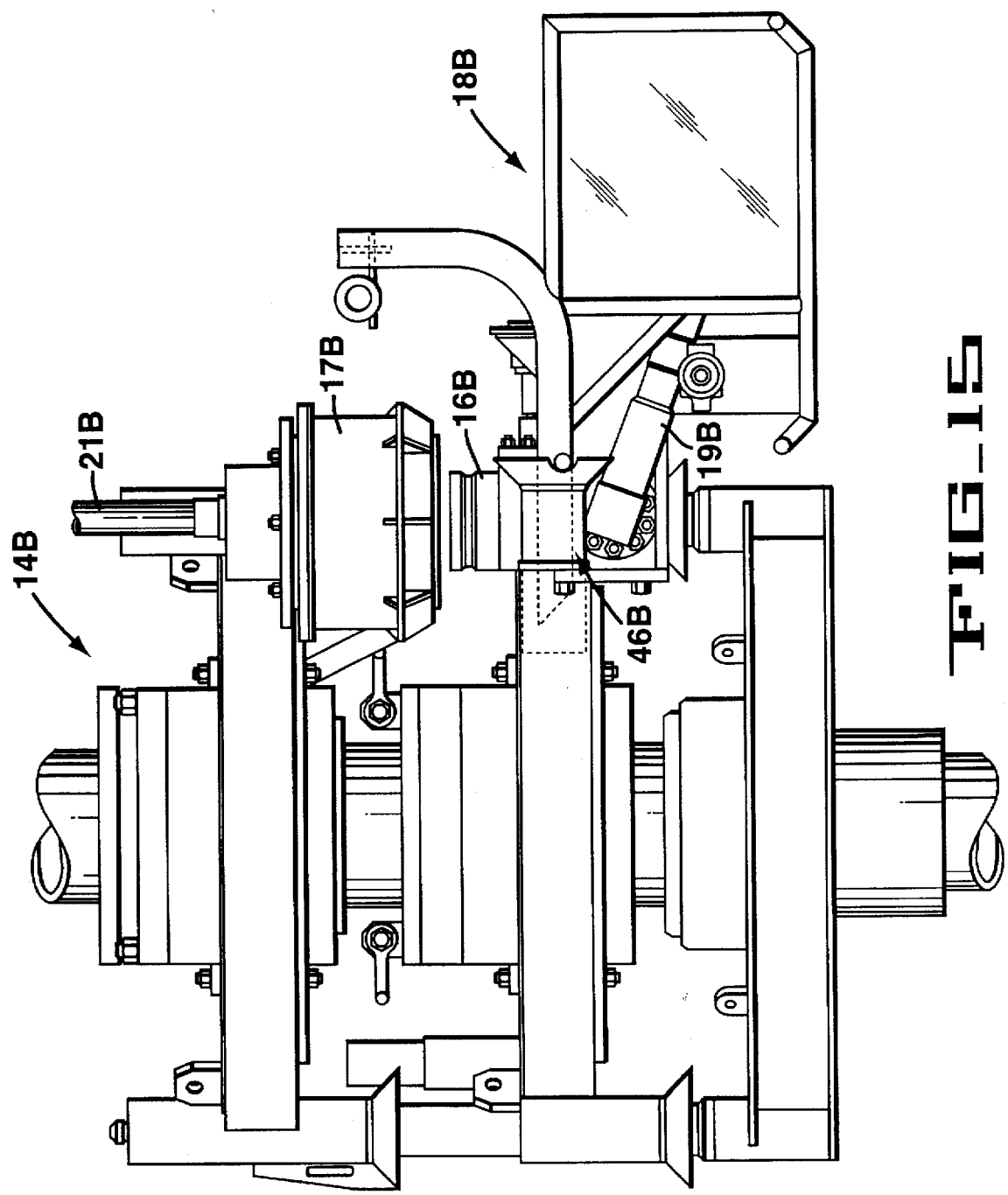

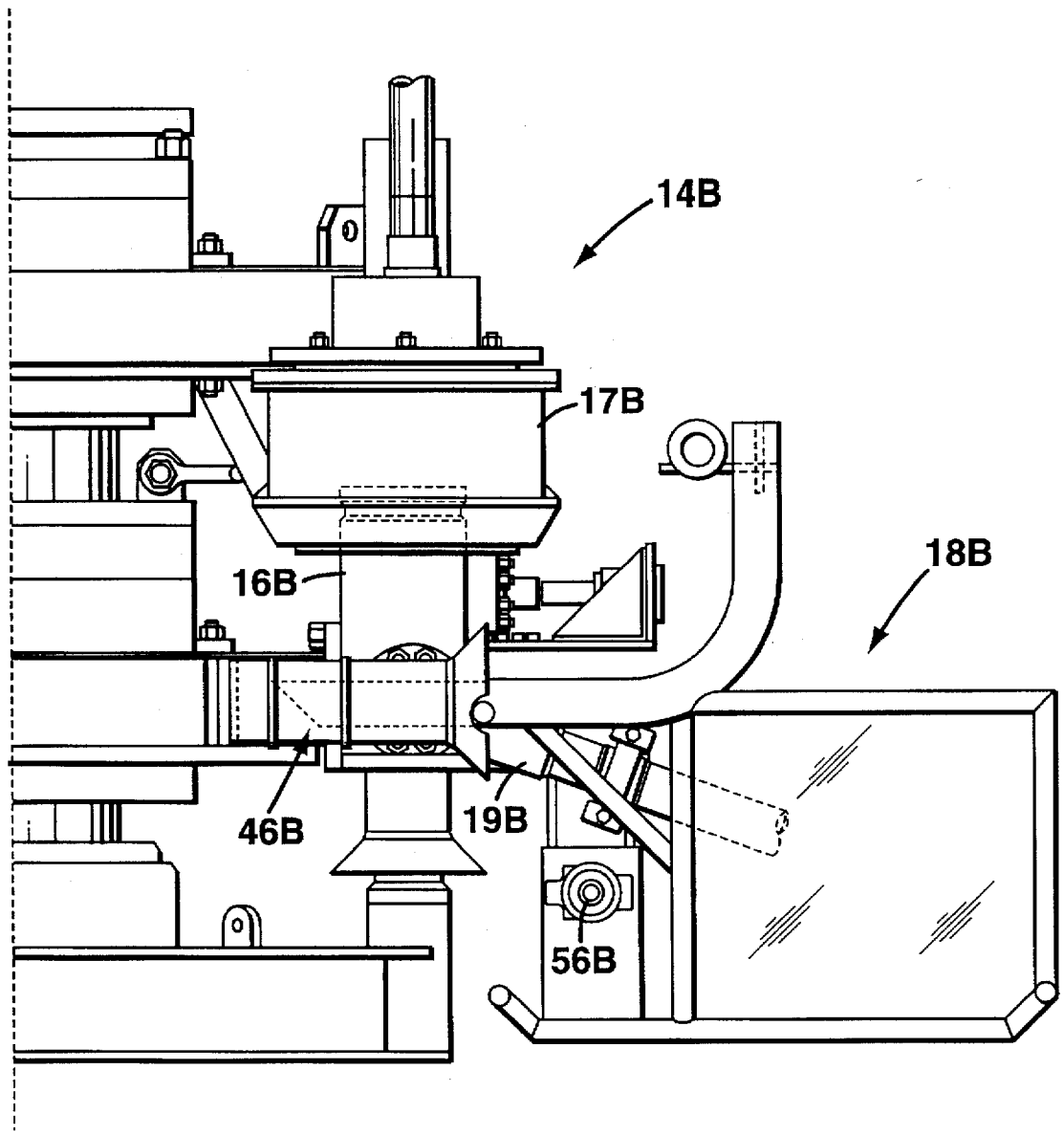
FIG_16

5,730,551

SUBSEA CONNECTOR SYSTEM AND METHOD FOR COUPLING SUBSEA CONDUITS

FIELD OF THE INVENTION

This invention relates generally to a subsea connector system and method for coupling a subsea conduit to a conduit on a generally stationary sub sea facility. The subsea system and method includes a skid on the sea floor which is movable by a flexible lift line from a surface location into a docked position on the subsea facility for coupling of the conduits to each other.

BACKGROUND OF THE INVENTION

Heretofore, subsea connector systems for connecting subsea conduits to each other have been provided and oftentimes have included a diver to assist in making the connection. A diverless subsea connector system has also been provided heretofore in a so-called "lay-away" flowline type subsea christmas tree. Such a system utilizes a flexible flowline for making the connection between the flowlines and the subsea tree at the surface prior to installation of a subsea tree on the subsea wellhead. This eliminates subsea flowline connections and permits the pressure testing of the connections in the moonpool of a surface service vessel. A bundle of flowlines are connected to a primary flowline hub which has a flexible flowline connected thereto for lowering of the hub subsea. The hub is connected to the tree before the tree is lowered from the rig to the sea floor. The flowlines are pressure tested with the sub sea tree in the moonpool to assure reliable operation once the tree is placed in position. The flowlines may be hydraulically unlocked from the tree at the same time the tree is unlocked from the well should a tree have to be retrieved during a well workover. The flowline bundle may be left in position as the tree is removed from the subsea wellhead in a vertical motion.

U.S. Pat. No. 4,075,862 dated Feb. 28, 1978 illustrates a diverless subsea connector system for installing a flowline on which a flowline mating vehicle is lowered into the sea and is docked on a subsea facility. A movable flowline is then coupled to a stationary flowline. There is no showing of a connector vehicle which is moved along guide lines into a docked position on the subsea facility.

U.S. Pat. No. 5,255,744 dated Oct. 26, 1993 shows a lay-away type Christmas tree which has flowlines attached and tested prior to being lowered into the sea. A remote operated vehicle (ROV) and an installation tool are also utilized in the sub sea connections and are controlled from the supply boat. There is no showing of a completion vehicle that is movable along guide lines into a docked position on a subsea facility. Other diverless subsea flowline connection systems are shown in U.S. Pat. No. 4,161,367 dated Jul. 17, 1979 and U.S. Pat. No. 4,367,980 dated Jan. 11, 1983.

SUMMARY OF THE INVENTION

The present invention is particularly directed to a subsea connector system and method for the subsea coupling of a conduit to an aligned conduit on a generally stationary sub sea facility. The subsea facility may, for example, comprise a sub sea satellite Christmas tree, a manifold structure, or a subsea connection structure. The conduit may, for example, comprise a fluid flowline or pipeline, control umbilical lines, chemical injection lines, or annulus monitor lines. A skid carrying one of the conduits to be connected is supported on the sea floor adjacent the subsea facility. A lift line means or structure extending from a surface location to the skid effects movement of the skid into a docked position upon lifting of the lift line means from a surface location. The lift line means is directed by guide means on the skid from a vertical direction to a generally horizontal direction. The extending end of the lift line means is anchored to the subsea facility. Upon raising of the lift line means, the skid contacts the subsea facility and is guided upwardly into a docked position on the subsea facility. In the docked position, the conduits on the subsea facility and the skid are in an aligned position for coupling to each other.

The lift line means or structure preferably includes a single upper lift line and a pair of generally parallel lower lift lines or guide lines for lifting and guiding the skid. The pair of guide lines or lower lift lines are connected to the skid from the upper lift line. A three point spreader bar is connected between the upper lift line and the pair of lower guide lines extending to the skid. The guide means on the skid include guide means for each of the guide lines to change the direction of the guide lines from a vertical direction to a generally horizontal direction for anchoring to the adjacent subsea facility. The guide means for each of the guide lines has a guide portion on the forward end of the skid to resist lateral movement of the associated guide line thereby to assist in steering of the skid upon lifting of the lower guide lines by the upper lift line. A remote operated vehicle (ROV) may be utilized for releasably anchoring the lower guide lines to the subsea facility for pulling the skid onto the subsea facility. In one embodiment, a pair of "so-called" J-tubes are mounted on the skid to receive the guide lines and to change the direction of the guide lines.

The subsea facility has guide means above a side thereof to receive coacting guide means on the skid. The subjacent side has a sloping contact surface below the guide means for engagement by the skid and upward movement of the skid along the sloping side into a docked position with the guide means on the skid and subsea facility in aligned position for releasably locking to each other. The remote operated vehicle (ROV) preferably is utilized for releasably securing the skid to the subsea facility when in a docked position and for coupling the aligned conduits to each other. The conduits are preferably provided with coacting coupling means that are engaged upon accurate alignment of the conduits by the ROV, Features of this invention include a subsea connector system and method in which a movable skid having a conduit thereon is moved into a docked position on a subsea facility for coupling with an aligned conduit on the subsea facility in a combined lifting and forward movement of the skid along a contacting surface of the sub sea facility. The combined lifting and forward movement of the skid is obtained by a flexible lift line structure extending vertically from a surface location to the skid and then extending generally in a horizontal direction to the subsea facility where it is anchored for pulling of the skid in a combined lifting and forward movement into a docked position.

Another feature includes the coacting guide means on the skid and the subsea facility for guiding the skid into a docked position. The coacting guide means include a pair of guides on the skid and a complementary pair of coacting guides on the subsea facility for alignment of the skid for movement into a docked position.

A further feature includes the lift line means for movement of the skid upon raising of an upper lift line from a surface location. A single upper lift line is connected to a pair of lower guide lines on the skid which are directed by the guide means on the skid from a vertical direction to a generally horizontal direction for anchoring on the subsea facility to be pulled into a docked position on the subsea facility.

Other advantages and features of this invention will be apparent from the following drawings and specifications.

BRIEF DESCRIPTION OF THE DRAWINGS

FIG. 1 is a schematic view of the subsea connector system of the present invention showing a skid on the subsea having a conduit thereon for coupling to a conduit on a generally stationary subsea facility;

FIG. 2 is a top plan of the skid shown in FIG. 1 positioned adjacent a subsea facility for being pulled and lifted into a docked position on the subsea facility. FIG. 3 is an enlarged side elevation of the skid shown in FIGS. 1 and 2 taken generally along line 3—3 of FIG. 2 with flexible lower guide lines received within a pair of parallel J-tubes on the skid and adapted for anchoring to guide means on the subsea facility;

FIGS. 4–7 are schematic views showing in sequence the docking of the skid on the subsea facility utilizing a remote operated vehicle (ROV) and an upper lift line from a surface location to pull and raise the skid in a combined forward and lifting movement onto the subsea facility;

FIG. 8 is a top plan of a preferred embodiment of this invention showing a skid in docked position on a subsea facility with a generally horizontally extending conduit on the skid in position for coupling with a horizontally extending conduit on the subsea facility;

FIG. 9 is a side elevation of the skid shown in FIG. 8 taken generally along line 9—9 of FIG. 8;

FIG. 10 is an end elevation of a skid shown in FIG. 8 taken generally along line 10—10 of FIG. 8;

FIG. 11 is an enlarged elevation taken generally along line 11—11 of FIG. 8 and showing guide means on the skid and subsea facility in aligned docked position;

FIG. 12 is a side elevation, partly in section, showing the skid as illustrated generally in FIGS. 1–7 having a generally vertically extending conduit or flowline hub secured thereto;

FIG. 13 is a top plan of the skid shown in FIG. 12;

FIG. 14 is an end elevation of the skid shown in FIGS. 12 and 13; FIG. 15 shows the skid of FIGS. 12-14 in a docked position on a subsea wellhead structure with the flowline hub positioned beneath a vertically extending flowline conduit on the wellhead structure; and FIG. 16 is a fragmentary view similar to FIG. 15 but showing the vertically extending flowline hub on the skid raised into a coupled position with the flowline conduit on the wellhead structure.

DESCRIPTION OF THE INVENTION

Referring now to FIGS. 1–7, in which one embodiment of the invention is illustrated, a schematic view of the subsea connector system is illustrated in FIG. 1. A subsea facility 10 comprises a generally stationary underwater subsea facility having a horizontally extending flowline conduit 12 thereon. A subsea wellhead structure generally indicated at 14 has a flexible generally horizontal flowline conduit 16 extending therefrom. A forward portion of flowline conduit 16 is carried by a movable skid 18 on a seabed or sea floor F and has an end coupling 20 adapted for connection to conduit 12. A vessel 22 on the sea surface S has a suitable lift line means or structure generally indicated at 24 extending downwardly to skid 18 and adapted for pulling and raising skid 18 into a docked position on subsea facility 10 as will be explained further. A remote operated vehicle (ROV) 26 controlled from surface vessel 22 has an extending arm 28 and assists in the docking of skid 18 and the coupling of conduits 12 and 16. Vessel 22 has a suitable winch and other suitable mechanisms thereon for the movement and control of lift line means or structure 24.

Referring now to FIGS. 2–7, skid 18 has guide means for lift line means 24 comprising a pair of J-tubes generally indicated at 30 each including a generally vertical upper portion 32 and a generally horizontal lower portion 34. Retainer openings 35 are provided in lower portions 34. Lift line means 24 includes a single upper flexible lift line 24 and a pair of guide lines or lower lift lines 38. A rigid triangular spreader bar shown at 40 connects upper lift line 36 to guide lines 38. Upper vertical portions 32 of J-tubes 30 are positioned generally in transverse alignment with the center of gravity of skid 18.

Guide lines 38 are fairleaded through J-tubes 30 to change the direction of guide lines 38 from a vertical direction to a horizontal direction thereby to form guide means for lift line means 24 and to aid in the steering of skid 18. The ends of guide lines 38 have anchor members 42 secured thereon for anchoring of guide lines 38 on subsea facility 10. Actuating rods 44 secured to anchor members 42 extend therefrom for engagement by arm 28 of ROV 26. Eyes 43 are secured to vertical upper portions 32 as shown in FIG. 2 to permit the initial positioning of skid 18 on seabed F from vessel 22. When being initially lowered into the sea or when not being docked, guide lines 38 and spreader bar 40 are disconnected from upper lift line 36 and are tied down on skid 18 along with anchor members 42 for release by remote operated vehicle (ROV) 26 as desired.

Mounted on the upper side of subsea facility 10 are guide means comprising a pair of tubular guides generally indicated at 46 having frusto-conical forward ends 48 for contacting and guiding J-tubes 30 into tubular guides 46 for docking of skid 18. Guides 46 have upper longitudinal slots 50 therein to receive guide lines 38 therein. For attaching or anchoring skid 18 to subsea facility 10 for docking, arm 28 of ROV 26 engages actuating rods 44 to position guide lines 38 within slots 50 with anchor members 42 at the rear ends of guides 46. Retainer openings 51 are provided in tubular guides 46 for aligning with openings 35 in J-tubes 30. With the ends of guide lines 38 anchored, skid 18 may be docked on subsea facility 10 in a combined pulling and lifting action. Upon lifting of upper lift line 36, an inclined side 52 of subsea facility 10 extends downwardly from guides 46 and is adapted to contact J-tubes 30 for guiding of skid 18 into docked position.

As shown in FIG. 2, a rotatable shaft 56 has a pair of nuts 58 threaded thereon for movement of nuts 58 toward and away from each other upon rotation of shaft 56 by engagement of hub 60 by ROV 260 Suitable links or arms 62 extend between nuts 58 and coupling 20 for movement of coupling 20 and conduit 16 in a longitudinal direction upon rotation of shaft 56. In a docked position of skid 18, shaft 60 is rotated by ROV 26 to move coupling 20 into a coupled position with conduit 12.

Operation of Subsea Connector System of FIGS. 1–7

Referring particularly to FIGS. 4–7 for docking of skid 18 and coupling of conduits 12 and 16, guide lines 38 with anchor members 42 thereon along with spreader bar 40 have been pre-rigged at the surface location and temporarily secured to skid 18 for the deployment of skid 18 to sea floor F from suitable lines connected to eyes 43. Coupling 20 and the adjacent portion of conduit 16 are also secured to skid 18 prior to deployment on sea floor F. Conduit 16 on skid 18 is connected to wellhead structure 14 by ROV 26 after skid 18 is initially positioned on sea floor F. If skid 18 is initially positioned at an unsuitable location on sea floor F for docking on subsea facility 10, ROV 26 can attach lift lines to eyes 43 for movement of skid 18 to a desired position.

When skid 18 is in the proper position for docking as shown in FIG. 4, ROV 26 disconnects any tiedowns for guide lines 38 and anchor members or headache balls 42 and then positions the anchor members 42 behind tubular guides 46 with guide lines 38 being received through slots 50 in tubular guides 46 as shown particularly in FIG. 4. Then, ROV 26 returns to skid 18 to connect spreader bar 40 to upper lift line 36 as shown in FIG. 5. Upper lift line 36 is then pulled taut to take up the slack in guide lines 38 so that substantially equal tension is applied to both guide lines 38. Guides 46 on subsea facility 10 are positioned at a height above horizontal portions 34 of J-tubes 30. Guide lines 38 extend downwardly from guides 46 in an angular direction for raising skid 18 and moving skid 18 in a forward direction to produce a combined movement as illustrated in FIG. 6. The forward ends of J-tube portions 34 contact the adjacent sloping side 52 of subsea facility 10 and are guided by side 52 thereof into receiving position with tubular guides 46. In this position, openings 35 in J-tubes 30 are in horizontal alignment with openings 51 in tubular guides 46. ROV 26 may then be used to insert suitable retainer pins (not shown) in the aligned openings 35 and 51. The tension in lift line means 24 is then relieved and guide lines 38 are then cut by ROV 26 so that spreader bar 40 may be retrieved at the surface location such as vessel 22. In this position, coupling 20 is in axial alignment with conduit 12 but spaced from conduit 12 as shown in FIG. 2. Hub 60 is then engaged by ROV 26 for rotation of shaft 56 to move coupling 20 into position with conduit 12 for suitable coupling as well known.

Skid 18 may remain in place or may be recovered, if desired. If desired to be recovered, the retaining pins in aligned openings 45 and 51 are removed by ROV 26 after a lift line has been connected by ROV 26 to eyes 43 on J-tubes 30 and tension applied by the lift line. As soon as the retainer pins are removed, skid 18 can be pulled in a rearward direction and then lifted to the surface for repair and re-deployment with a new or repaired flowline conduit as desired.

Preferred Embodiment of FIGS. 8–11

Referring now to FIGS. 8–11, a preferred embodiment of the present invention is illustrated in which skid 18A is shown in a docked position on subsea facility 10A prior to coupling of conduit 16A on skid 18A to conduit 12A on subsea facility 10A. Subsea facility 10A has a sloping side 52A below guide structures 46A on adjacent corners of subsea facility 10A above side 52A. Each guide structure 46A includes a pair of inclined guide wings 47A leading to a pair of spaced parallel vertical plates 49A which extend upwardly from guide wings 47A. Plates 49A have aligned openings 51A therein to receive a retainer pin (not shown). A lateral plate 53A is secured between vertical plates 49A and has a notch 55A therein to receive an anchor line. A U-shaped guide 57A (see FIGS. 8 and 11) is likewise secured between plates 49A to receive the anchor line. A lower horizontal guide plate 59A is secured between plates 49A.

Skid 18A has a generally rectangular body formed of tubular frame members secured to each other. A pair of parallel upper tubular members 31A extend longitudinally; a pair of transverse tubular members 33A are secured between tubular members 31A. A front inclined tubular member 34A on opposed sides of skid 18A has a forward end portion 37A extending upwardly beyond the forward ends of upper tubular members 31A. As shown particularly in FIG. 11, the outer upper end of each end portion 37A has a pair of spaced outer vertical plates 39A with a horizontal guide bar or pin 41A secured between vertical plates 39A. As shown in FIG. 8, inner forward guide plates 43A have openings 35A therein adapted for alignment with openings 51A in plates 49A in a docked position of skid 18A on subsea facility 10A. A rear guide pin or rod 32A for each guide line 38A is mounted on the rear end of each tubular frame member 31A between a pair of vertical plates 30A.

A pair of guide lines 38A similar to the guide lines 38 in the embodiment of FIGS. 1–7 extend beneath guide pins 32A and guide pins 41A. For docking, the ROV places anchor members 42A on the ends of guide lines 38A behind notches 55A. The upper lift line is then raised to lift guide lines 38A vertically and move skid 18A horizontally in a combined pulling and lifting movement against sloping side 52A of subsea facility 10A. Inclined front tubular members 34A contact inclined side 52A and are being pulled upwardly along sloping side 52A with forward guide plates 43A being guided by wings 47A into an aligned position with subsea facility 10A. As shown particularly in FIGS. 8 and 11, forward guide plates 43A on skid 18A are moved by skid 18A between vertical plates 49A on subsea facility 10A beneath horizontal plate 59A. In this position, openings 35A of skid 18A and 51A of subsea facility 10A are in horizontal alignment. Retainer pins (not shown) may be inserted through the aligned openings by the ROV for securing skid 18A in a docked position on subsea facility 10A.

In the docked position, coupling 20A on the end of conduit 16A is spaced horizontally from the opposed end of conduit 12A on subsea facility 10A. A pair of hydraulic cylinders 61A are secured at one end to transverse tubular member 33A and secured at an opposite end to clamping structure 63A which is secured to conduit 16A. Actuation of hydraulic cylinders 61A by the ROV moves coupling 20A horizontally into engagement with conduit 12A for coupling of conduits 12A and 16A together as illustrated schematically in FIG. 7.

Embodiment of FIGS. 12–16, Vertically Extending Conduit Connector

Referring now to FIGS. 12–16, a further embodiment of this invention is illustrated in which a skid 18B has a vertically extending flowline hub 16B mounted thereon for coupling to a flowline connector indicated at 17B (see FIGS. 15, 16) on a subsea wellhead structure generally indicated at 14B. FIGS. 12–14 show skid 18B and flowline hub 16B detached from wellhead structure 14B. FIG. 15 shows skid 18B and flowline hub 16B docked on wellhead structure 14B prior to coupling while FIG. 16 shows skid 18B and flowline hub 16B docked with flowline hub 16B connected to flowline connector 17B on wellhead structure 14B. A suitable vertical flowline 21B connected to flowline connector 17B extends to a surface location. Hub 16B may include control umbilical lines, monitor lines, as well as fluid flowlines for various fluids such as hydraulic fluid, chemical fluids, or hydrocarbon fluids. A pair of guides shown generally at 46B on wellhead structure 14B are designed and arranged to receive skid 18B in docked position and to be removably secured to skid 18B as in the embodiment of FIGS. 1–7. Hub 16B also includes a side outlet which receives a swiveling flowline arm 19B as shown particularly in U.S. Pat. No. 5,044,672 dated Sep. 3, 1991, the entire disclosure of which is incorporated herein by reference.

Referring now particularly to FIGS. 12-14, skid 18B is generally similar to skid 18 of the embodiment of FIGS. 1-7 but includes the mounting of flowline hub 16B on skid 18B. A pair of J-tubes 30B are provided to guide anchor lines received therein to wellhead structure 14B for pulling and lifting skid 18B into a docking position on wellhead structure 14B. Eyes 43B on J-tubes 30B are utilized for the initial lowering of skid 18B onto the sea floor. The forward end portions 34B of J-tubes 30B are designed to be fit within aligned guides 46B on wellhead structure 14B after docking. Flowline hub 16B may be raised and lowered by rotation of shaft 56B by an ROV. Nuts 58B are threaded onto shaft 56B and links 62B are connected to flowline hub 16B for raising and lowering flowline hub 16B upon rotation of shaft 56B in a desired direction.

In operation, skid 18B is lowered into position in a manner similar to skid 18 of the embodiment for FIGS. 1-7 with the guide lines (not shown) extending through J tubes 30B as in the embodiment of FIGS. 1-7. The guide lines are anchored (not illustrated) onto wellhead structure 14B and upon lifting of the guide lines, skid 18B is pulled and lifted into a docked position on wellhead 14B with the forward ends 34B of J-tubes 30B positioned within guides 46B of wellhead structure 14B. In this position an ROV mounts retainer pins (not shown) into aligned openings in J-tubes 30B and guides 46B for securing skid 18B in the position of FIG. 15 with flowline hub 16B positioned beneath flowline connector 17B. In the position of FIG. 15, shaft 56B is rotated by the ROV to raise flowline hub 16B into a coupled position with flowline connector 17B as shown in FIG. 16.

The movable skid of which the present invention is embodied allows the skid to float laterally so that the conduits can be easily aligned and coupled both for a horizontal connector system and a vertical connector system. Further, the lift line structure utilizes a three point spreader bar to connect an upper vertical lift line to a pair of lower guide lines which are directed in a generally horizontal direction for anchoring onto a subsea facility to permit the skid to be pulled forwardly and raised in a combined movement. Such a movement minimizes any resistive forces which result from pulling or dragging a skid across the sea floor and minimizes any disturbance of the sea floor which might restrict visibility as might be required for ROV operations. The present subsea connector system also provides a diverless means for coupling subsea conduits together, and for disconnecting any damaged flowline conduits for installation of new flowline conduits.

While preferred embodiments of the present invention have been illustrated in detail, modifications and adaptations of the preferred embodiments will occur to those skilled in the art. However, it is to be expressly understood that such modifications and adaptations are in the spirit and scope of the present invention as set forth in the following claims.

What is claimed is:

1. A method for coupling a pair of conduits to each other subsea with one of the conduits being relatively fixed and mounted on a stationary subsea facility on the seabed and the other conduit being movable, said method comprising the following steps:

providing a structure having said movable conduit mounted thereon;

providing a lift line device extending generally vertically upwardly from said structure;

providing guide means on said structure to receive said flexible lift line device and to change the path of said flexible lift line device from a vertical direction to a generally horizontal direction, anchoring a lower end of said flexible lift line device to the stationary subsea facility; and lifting said vertically extending flexible lift line device to move said structure and conduit thereon generally horizontally and vertically upwardly into a predetermined docked position on said subsea facility in which said conduits are aligned for coupling to each other.

2. The method for coupling a pair of conduits to each other as set forth in claim 1 wherein said structure is a skid designed for movement along the seabed, the method further including the steps of:

providing cooperating guide means on said subsea facility for alignment with said guide means on said skid for guiding said skid into a docked position on said subsea facility; and moving said skid by said lift line device in a combined forward movement and lifting movement with said skid first contacting said subsea facility at a position below said guide means on said subsea facility and then moved upwardly into docked position.

3. The method for coupling a pair of conduits to each other as set forth in claim 2 including the steps of:

providing an anchor member on said lower end of said flexible lift line device; and removably mounting said anchor member on said subsea facility adjacent said guide means thereon for anchoring said flexible lift line device to said subsea facility.

4. A method for coupling a pair of conduits to each other subsea with one of the conduits being relatively fixed and mounted on a subsea facility on the seabed and the other conduit being movable, said method comprising the following steps:

providing a skid for being pulled along the seabed;

mounting said movable conduit on said skid;

providing a pair of lower flexible guide lines extending generally vertically upwardly from said skid;

providing guide means on said skid to receive said pair of generally vertically extending flexible guide lines to change the direction of the said pair of guide lines to a generally horizontal direction;

anchoring the lower ends of said flexible guide lines to a generally stationary subsea facility; and lifting said pair of vertically extending flexible guide lines to move said skid and conduit thereon generally horizontally and vertically upwardly into a predetermined docked position on said subsea facility in which said conduits are aligned for coupling to each other.

5. The method for coupling a pair of conduits to each other as set forth in claim 4 including the steps of:

providing cooperating guide means on said subsea facility for alignment with said guide means on said skid for guiding said skid into a docked position on said subsea facility; and anchoring said flexible guide lines to said subsea facility adjacent said guide means thereon for pulling said skid in a combined forward movement and lifting movement into a docked position.

6. The method for coupling a pair of conduits to each other as set forth in claim 4 including the steps of:

mounting said movable conduit on said skid in a generally horizontal direction; and mounting said relatively fixed conduit on said subsea facility in a generally horizontal direction for coupling to said movable conduit on said skid.

7. A method for coupling a pair of conduits to each other as set forth in claim 4 including the steps of:

mounting said movable conduit on said skid for terminating in a generally vertically facing direction; and mounting said relatively fixed conduit on said subsea facility for extending in a generally vertically facing direction for coupling to said movable conduit.

8. The method for coupling a pair of conduits to each other as set forth in claim 4 including the steps of:

connecting a single upper lift line to said pair of lower guide lines for pulling said lower guide lines vertically upon lifting of said single upper lift line for movement of said skid.

9. The method for coupling a pair of conduits to each other as set forth in claim 8 including the step of:

providing a three point spreader bar between said pair of lower guide lines and said upper lift line for connection of said upper lift line to said pair of lower guide lines.

10. The method for coupling a pair of conduits to each other as set forth in claim 4 including the steps of:

providing cooperating guide means on said subsea facility for alignment with said guide means on said skid;

providing a guide surface along a side of said subsea facility and below said guide means thereon for contact of said skid during docking of said skid; and lifting said skid for generally vertical movement along said guide surface until a docking position is achieved with said guide means on said skid and said cooperating guide means on subsea facility coming into an aligned position.

11. The method for coupling a pair of conduits to each other as set forth in claim 4 including the steps of:

providing an anchor member adjacent the horizontal end of each of said guide lines; and providing a remote operated vehicle to lift said anchor members and position said anchor members in a location for anchoring said lower lines to said subsea facility.

12. The method of coupling a pair of conduits to each other as set forth in claim 4 including the steps of:

providing releasable locking members for releasably securing said guide means on said skid to said subsea facility when said skid is docked; and providing a remote operated vehicle to position said locking members into releasably locked position with said guide means on said skid and said subsea facility.

13. A subsea system for coupling a pair of conduits to each other comprising:

a generally stationary subsea facility mounted on the seabed and having a conduit thereon;

a movable skid having a conduit thereon and supported for movement along the seabed to said subsea facility for coupling of said conduits to each other;

a flexible lift line structure extending from a surface location to said skid for exerting an upward pulling force;

line guide means on said skid for directing said lift line structure from a generally vertical direction to said skid to a generally horizontal direction from said skid to said subsea facility;

means on said subsea facility to anchor a horizontal end of said flexible lift line structure; and coacting guide means on said subsea facility and said skid for positioning said skid into aligned position with said subsea facility upon pulling of said lift line structure upwardly for docking of said skid to permit coupling of said pair of conduits to each other.

14. The subsea system of claim 13 wherein:

said subsea facility has a side thereof defining a guide surface for contact by said skid for movement of skid upwardly along said surface into docked position upon lifting of said flexible lift line structure.

15. The subsea system of claim 13 wherein a remote operated vehicle is provided for anchoring of said flexible lift line structure on said subsea facility.

16. The subsea system of claim 13 wherein:

said lift line structure includes a pair of generally parallel spaced flexible lower guide lines extending between said skid and said subsea facility and anchored to said subsea facility for exerting a pulling force on said skid for movement of said skid toward said subsea facility;

said coacting guide means on said subsea facility including a pair of guides positioned above said coacting guide means on said skid for guiding said skid into docked position.

17. A subsea skid operable for movement along a seabed adjacent a generally stationary subsea facility having a conduit thereon and operable for docking on said subsea facility; said skid comprising:

a conduit mounted on said skid for movement with said skid for coupling with the conduit on said stationary subsea facility; and guide means on said skid operable to direct a lift line structure extending generally vertically from a surface structure to said skid from a vertical direction to a generally horizontal direction toward said subsea facility for docking of said skid on said subsea facility and coupling of said conduits upon lifting of said line.

18. The subsea skid of claim 17 wherein, said guide means includes a rear guide portion for receiving said lift line structure from a vertical position and directing said left line structure in a generally horizontal direction, and a front guide portion on a forward end of said skid for receiving said lift line structure from said rear guide portion to provide guiding of said skid toward said subsea facility.

19. The subsea skid of claim 18 wherein:

said guide means includes a pair of J-tubes each having a generally vertical portion and a generally horizontal portion and operably arranged to receive and direct said lift line structure to said subsea facility.

20. The subsea skid of claim 17 wherein:

said lift line structure includes a pair of lower flexible guide lines mounted on said skid and guided by said guide means; and an anchor member is secured to horizontal end of each guide line for anchoring on the subsea facility.

* * * * *